United States Patent [19]

Kraeutler

[11] Patent Number: 4,824,505
[45] Date of Patent: Apr. 25, 1989

[54] METHOD OF FABRICATING FLEXIBLE CURTAINS OF ANY SIZE

[76] Inventor: Bernard Kraeutler, 1 rue du Château, 43220 Dunieres, France

[21] Appl. No.: 78,144

[22] Filed: Jul. 27, 1987

[30] Foreign Application Priority Data

Jul. 29, 1986 [FR] France ................ 86 10743

[51] Int. Cl.⁴ .............................. B32B 31/18
[52] U.S. Cl. ...................... 156/227; 156/264; 156/266; 160/84.1; 112/262.1
[58] Field of Search ........... 156/157, 264, 266, 204, 156/227, 304.1, 304 B, 65, 70, 293; 160/8, 9, 84 R, 231 R, 201, 349, 84.1, 368 R; 112/262.1; 52/5

[56] References Cited

U.S. PATENT DOCUMENTS

| | | | |
|---|---|---|---|
| 1,426,663 | 8/1922 | Martin | 160/84.1 |
| 3,487,875 | 1/1970 | Shukat et al. | 160/84.1 |
| 3,617,418 | 11/1971 | Miller | 156/204 |
| 4,343,667 | 8/1982 | Hollis | 156/157 |
| 4,368,770 | 1/1983 | Ulfhielm | 160/84 R |
| 4,397,347 | 8/1983 | Brabant | 160/231 R |
| 4,712,598 | 12/1987 | Bonacci et al. | 160/84 R |
| 4,718,471 | 1/1988 | Kraeutler | 160/84 R |

Primary Examiner—Caleb Weston
Attorney, Agent, or Firm—Sughrue, Mion, Zinn, Macpeak and Seas

[57] ABSTRACT

Flexible curtains stiffened at regular intervals by reinforcing bars (9), the curtain being of the type suitable for constituting a goods-handling door, are fabricated with a welding station (5) which is movable along three orthogonal axes, a table (1) having a top (11) optionally fitted with at least one series of brooves (a, b, c, d, e, f; a, g, h, i, f) which are equidistant, and parallel to one of the displacement axes of the welding station, and at least two retaining members (7, 7') which are perpendicular to the grooves, at least one of the members being movable.

16 Claims, 3 Drawing Sheets

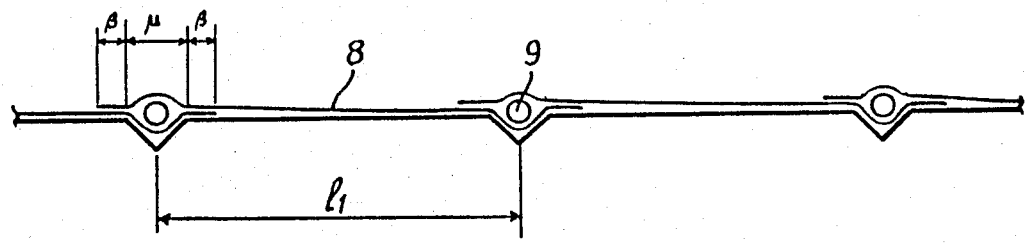
Fig: 2
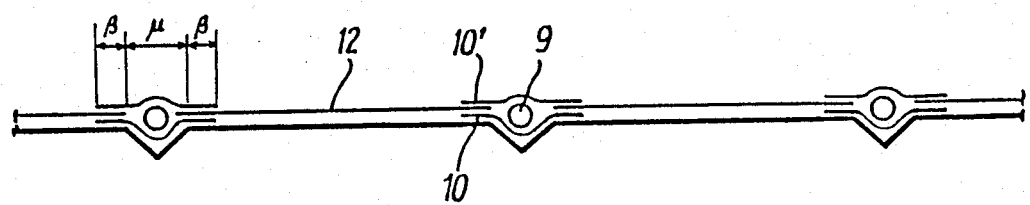
Fig: 3
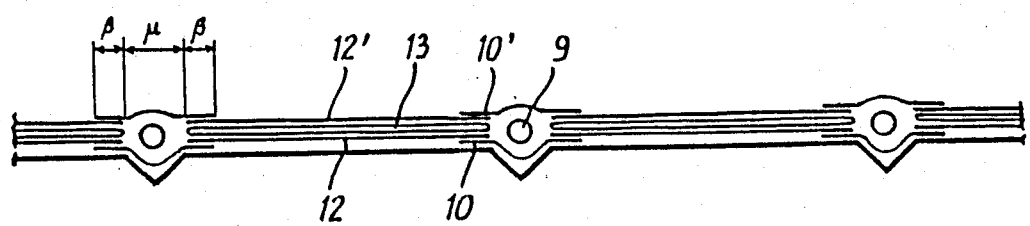
Fig: 4

Fig: 5
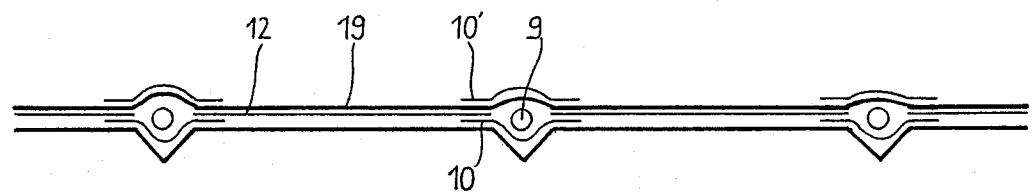
Fig: 6
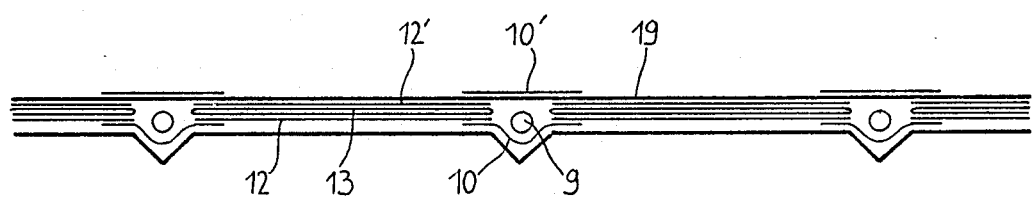
Fig: 7
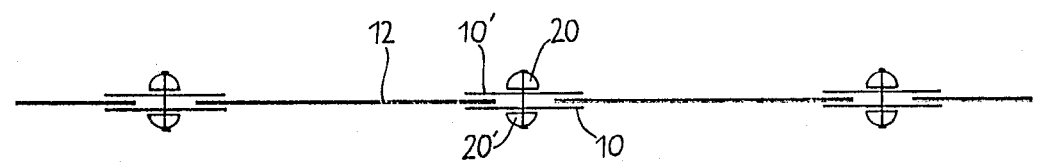

METHOD OF FABRICATING FLEXIBLE CURTAINS OF ANY SIZE

The present invention relates to a method of fabricating flexible curtains of any size, to apparatus for implementing the method, and to curtains fabricated in accordance with the method.

BACKGROUND OF THE INVENTION

The invention relates in particular to flexible curtains for goods-handling doors. Goods-handling doors are installed on buildings such as factories and warehouses in which there is a need for considerable traffic between the inside and the outside. The purpose of such doors is to provide a heat screen, i.e. to reduce heat exchange between the inside and the outside while avoiding impeding the passage of goods-handling vehicles. For these reasons, doors of this type are fast-acting, both when opening in order to provide passage for users substantially instantaneously, and when closing in order to limit as much as possible the time during which inside and outside masses of air come into contact. For structural reasons, the necessity of fast action has given rise to the development of lifting curtain doors which are made of light material, typically cloth or plastified cloth or plastic film.

Given the buildings in which such doors are usually installed (factories, warehouses, etc.) and regardless of the way in which the curtain is raised (e.g. by being wound around a shaft running over the opening, or by being folded concertina-like by mean of straps which are wound around a shaft running over the opening, or by being wound around a bar fixed to the bottom edge of the curtain, likewise by means of straps which in turn are wound around a shaft running over the opening) the curtains of such doors are generally large in size and it is important to stiffen them at regular intervals by means of horizontal reinforcing bars. It is conventional to fix such reinforcing bars to a flexible curtain by providing horizontal sheaths at regular intervals along the curtain with the reinforcing bars being inserted therein.

Given also the fairly high traffic density which such doors pass and the need to prevent collisions which could arise between two vehicles arriving simultaneously from opposite sides of an opaque curtain, windows are generally provided in the curtains of such doors and extend over a portion of their height, said windows being closed with transparent flexible plastic material.

From the above, it will easily be understood that using a roll of plastified cloth of given width to fabricate a curtain for a goods-handling door extending over several meters in each direction and including horizontal sheaths for receiving reinforcing bars and optionally including windows is a relatively complex operation.

Heretofore the curtains of goods-handling doors have been fabricated by craft methods. Thus, in order to make a curtain of height H and width W, a roll of plastified cloth of standard width (advantageously the widest width avilable on the market, which at present is 1.40 m) is cut into as many strips of length W as are required to fill the height H with widths of said plastified cloth, plus a margin. Two of these strips are then aligned with an overlapping margin of given width on an oblong table over which there is a device for welding (or sewing, or equivalent) capable of moving parallel to the longitudinal axis of said table. A shoe of the welding device is then placed over the overlap margin and the device is moved as often as necessary in order to weld together the two strips over their entire length. The operation is then repeated to weld another strip to the preceding strips, and so on until an entire curtain has been assembled. Once the curtain has been assembled, plastified cloth tapes are fastened to one of its faces at regular intervals parallel to its width by successively welding their longitudinal edges so as to form the sheaths for receiving the reinforcing bars. Once the curtain is provided with these sheaths, windows are optionally cut out between some of them and then closed by welding pieces of flexible transparent material therein. Naturally, these pieces are cut out to have greater areas than the windows by an amount sufficient to leave a peripheral overlap margin for welding purposes.

Heretofore, all stages of such fabrication have been performed manually, in particular the strips have been positioned manually relative to one another, they have been kept in place manually during welding, the windows have been cut out manually, and the transparent parts for closing the windows have been welded manually into place. Further, as described above, the strips have been positioned successively, i.e. there have never been more than two pieces of curtain which are being positioned relative to each other (either two strips at the beginning of curtain assembly, or subsequently one strip and the assembly of strips which have already been welded together). This fabrication method suffers from several major drawbacks, in particular requiring considerable manpower and considerable time, to which must subsequently be added the time required for inserting the reinforcing bars into each of the sheaths. Furthermore, curtains obtained by performing this method can be seen to be constituted by strips which are only approximately squared up and if they have windows, they have weak zones running along the vertical welds of the transparent parts, i.e. along the welds which extend perpendicularly to the winding or folding axis of the curtain.

The aim of the present invention is to remedy these various constitutional defects and drawbacks. It comprises apparatus for implementing a fabrication method which is both rapid and economical in manpower for fabricating flexible curtains for goods-handling doors whose strips and sheaths are accurately squared up prior to welding and which optionally include large area transparent surfaces while avoiding weak zones, in particular along intermediate vertical welds, while costing less than a prior art curtain.

SUMMARY OF THE INVENTION

According to the invention a method of fabricating a flexible curtain of width W which is stiffened at regular intervals by reinforcing bars and which is of the type suitable for providing a goods-handling door, comprises the steps of:

cutting strips of appropriate flexible material, said strips being of a length which is not less than substantially the desired width W for the curtain;

disposing said strips in parallel on a reference plane, such that their side edges are parallel with each pair of adjacent strips overlapping by a width approximately equal to the width of a sheath for receiving a reinforcing bar plus the width of two overlap margins for fastening said strips together;

holding the strips disposed in this manner relative to one another and relative to the reference plane; and successively fastening the strips in pairs over at least two fastening lines running parallel to their longitudinal edges and provided respectively in each of said two overlap margins which are separated by approximately the width of the sheaths.

According to the invention, another method of fabricating a flexible curtain of width W stiffened at regular intervals by reinforcing bars, the curtain being of the goods-handling door type, comprises the steps of:

cutting tapes of a suitable flexible material into lengths which are not less than substantially the desired width W of the curtain and of width approximately equal to the width of a sheath for receiving a reinforcing bar plus the width of two overlap margins;

cutting strips from at least one suitable flexible material, having substantially the same length as the tapes;

disposing first tapes in parallel on a reference plane;

disposing at least one strip between each consecutive pair of tapes so that the side edges of the strips are parallel and so that each of the longitudinal edges of said strip(s) overlaps the adjacent tape edge by an amount approximately equal to the width of the overlap margin;

disposing second tapes over the strips positioned in this way so that each second tape overlaps two consecutive strips, with the side edges of said tapes and said strips being parallel and each of the longitudinal edges of a tape covering the edge of a contiguous strip over a width approximately equal to the width of an overlap margin;

holding the strips and the tapes as disposed in this way in position relative to one another and relative to the reference plane;

fastening the strips and the tapes by sandwiching them together at least over two fastening lines running parallel to their longitudinal edges, said lines being respectively formed in the two overlap margins situated on the longitudinal edges of said tapes.

According to a characteristic of the invention, these methods further include the following steps after the step of fixing the strips (or the strips and the tapes) to one another;

the curtain is folded concertina-like, with the folds being formed level with each sheath and in the middle of each strip; and the curtain as folded in this manner is heated to give rise to irreversible deformation along each fold of the flexible material constituting said curtain.

According to the present invention, manufacturing apparatus for implementing this method includes: fastening means (welding means, sewing means, gluing means, or equivalent) which are movable along three orthogonal axes; a table including a plane rigid surface optionally provided with at least one series of equidistant grooves parallel to one of the displacement axes of the fastening means; and at least two holding members extending perpendicularly to said grooves, with at least one of said members being movable.

BRIEF DESCRIPTION OF THE DRAWINGS

Embodiments of the invention are described by way of example with reference to the accompanying drawings, in which:

FIG. 2 is a diagrammatic section view through a first type of curtain lying on a table forming part of apparatus in accordance with the invention, and taken in a plane perpendicular to the reinforcing bars of said curtain;

FIG. 3 is a diagrammatic section view through a second type of curtain lying on a table forming part of apparatus in accordance with the invention and taken in a plane perpendicular to the reinforcing bars of said curtain;

FIG. 4 is a diagrammatic section view through a third type of curtain lying on a table forming part of apparatus in accordance with the invention and taken in a plane perpendicular to the reinforcing bars of said curtain;

FIG. 5 is a diagrammatic section view of a fourth type of curtain lying on a table forming part of apparatus in accordance with the invention and taken in a plane perpendicular to the reinforcing bars of said curtain;

FIG. 6 is a diagrammatic section view through a fifth type of curtain lying on a table forming part of apparatus in accordance with the invention, and taken in a plane perpendicular to the reinforcing bars of said curtain; and FIG. 7 is a diagrammatic section view of a variant of the curtain shown in FIG. 2, taken in a plane perpendicular to the reinforcing bars of said curtain.

MORE DETAILED DESCRIPTION

Figure 1:
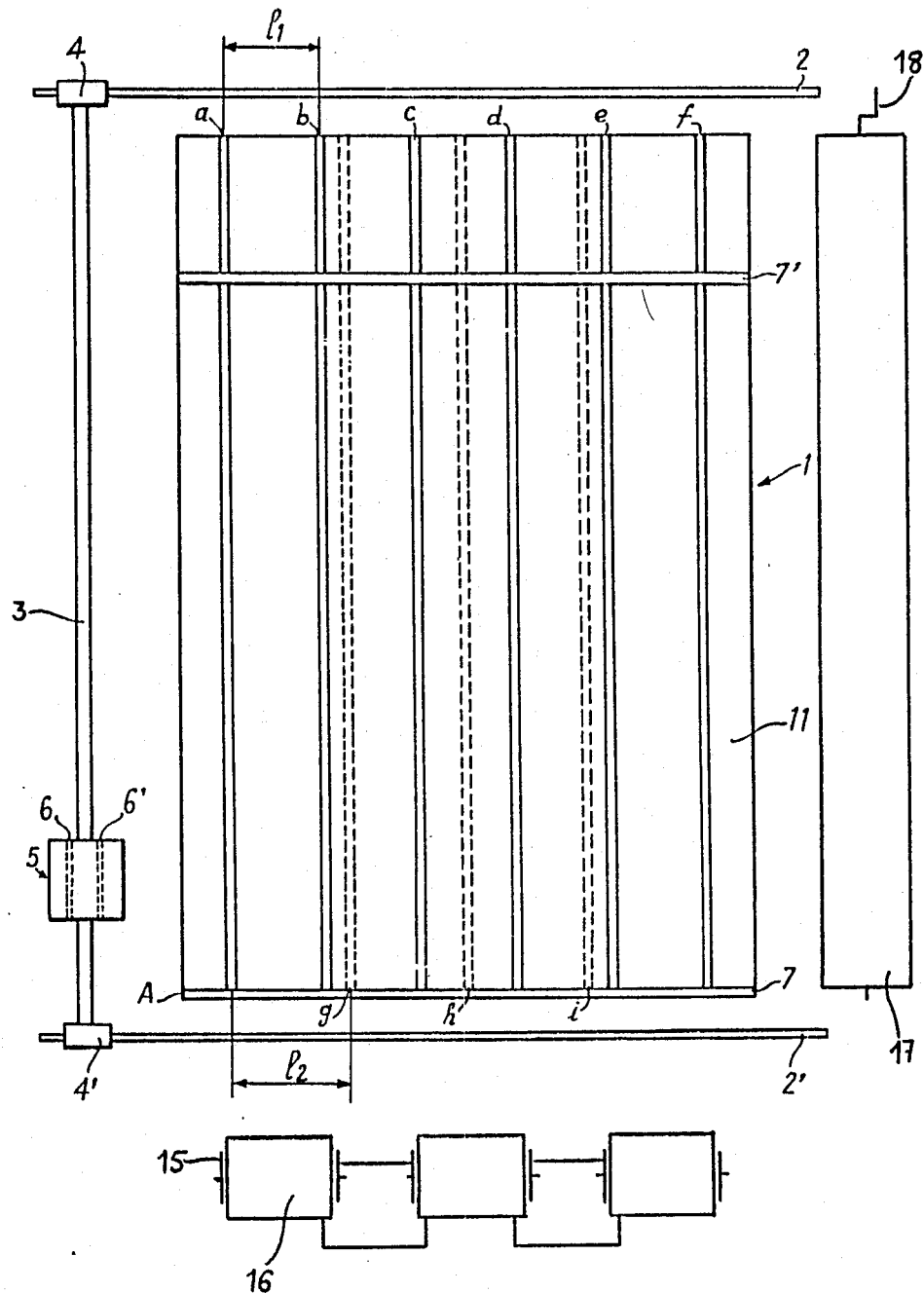
FIG. 1 is a diagrammatic plan view of apparatus for manufacturing flexible curtains in accordance with the invention.

FIG. 1 shows that apparatus for manufacturing the flexible curtains of goods-handling doors comprises a rectangular table 1 having two rails 2, 2' running thereover parallel to the width of said table. These rails and the fixed structure (not shown) to which they are fastened are not fixed to the top surface 11 of the table 1, nor do they bear thereagainst since this surface must remain completely free. The rails 2, 2' are used to support and guide a beam 3 which extends perpendicularly thereto with the ends of the beam being provided with running means 4, 4'. At least one of these running means 4, 4' is fitted with a motor which drives it and thus displaces the beam 3. The beam 3 is used for supporting and guiding a welding station 5 (or a sewing station or a gluing station or the like; although the term "welding" is used on its own throughout the remainder of this specification, it must be understood that it extends to any fastening means suitable for fixing sheets or plates of flexible material to one another). The welding station 5 includes running means, a motor, a vertical motion device, and at least one welding shoe 6, 6'. It is thus capable of running along the entire length of the beam 3 and of descending so that its welding shoes 6, 6' come into contact with the top surface 11 of the table 1. The shoes 6, 6' can be oriented in a plane parallel to the plane of the table top 11 and may, in particular, be locked in a direction which is parallel to or perpendicular to the width of the table 1. Advantageously, the welding station 5 includes two parallel welding shoes 6, 6' (as shown in the figure), for reasons described below. The gap between the rails 2, 2' and the stroke of the beam 3 along said rails are such that the welding station 5 can sweep over the entire table top 11. The table top stands on a support (not shown) and has a top surface which is rigid and perfectly plane. Usually, it extends over several meters in both directions. Advantageously, its length is approximately equal to the width of the widest curtains which are usually fabricated. Its width corresponds to a fraction of the height of the highest curtains which are usually fabricated. Technically, it is possible to make tables 1 having tops 11 of greater area than the largest curtains fabricated. However, in practice such tables are not constructed both for reasons of cost and above all for reasons of space. The table top 11 may include one or more series of equidistant grooves extending parallel to its long sides and spaced apart at a pitch which corresponds to the standard pitch(es) for curtain reinforcing bars. By way of example, FIG. 1 shows two series of grooves, a first series being constituted by six grooves a, b, c, d, e, and f, at a spacing $l_1$, and a second series of five grooves a, g, h, i, and f, at a spacing of $l_2$. As shown below, these grooves are not absolutely essential for fabricating curtains in accordance with the invention. Two retaining members, each comprising a rigid rule 7, 7' extending perpendicularly to the grooves a to i serve to hold down the portion of curtain being fabricated on the surface 11. These retaining members are fixed to the table top 11 over which they are displaceable, with the rules remaining perpendicular to the grooves of the top 11, i.e. perpendicular to the long sides of said table top. The apparatus for fabricating curtains in accordance with the invention also comprises a series of pay-out devices 15 for supporting reels 16 of a flexible material used for making curtains, and also a take-up device 17 for winding up the portion of curtain occupying the table top 11 after it has been completed, thereby releasing said table top for fabrication of the next portion of curtain and for connecting it to the portion of curtain which has already been fabricated. The axis of the pay-out devices 15 is perpendicular to the grooves in the surface 11. These pay-out devices are provided to support reels of different widths appropriate to the fabrication of different curtains in accordance with the method of the invention. The take-up device 17 comprises a cylinder whose axis is parallel to the grooves in the table top 11 and is of substantially the same length. The cylinder is supported at each of its ends so as to be able to rotate about its axis. It is rotated either manually (by means of a handle 18) or else by a motor.

Advantageously, the welding station 5 is moved along the beam 3 and along a vertical axis, and the beam 3 is moved along the rails 2, 2' under automatic control from a programmable unit (not shown), in accordance with data previously supplied to said unit, such data including the distance between the grooves ($l_1$ or $l_2$), the width of the curtain (i.e. as explained below the distance between the facing faces of the rules 7 and 7'), etc.

Operation of the above-described apparatus is explained below while explaining the fabrication method in accordance with the invention, and this is done for five different types of curtain.

Assume that the curtain shown diagrammatically in FIG. 2 is to be made using the apparatus shown in FIG. 1, i.e. apparatus including a grooved table top 11. As many strips 8 as may be required to make a curtain of height H are cut out from a roll of plastified cloth of appropriate width (the width of each strip is equal to $l_1$ plus twice the width $\mu$ of a sheath plus two times the width $\beta$ of the overlap margin necessary for welding purposes), and each strip is slightly longer than the width W of the curtain to be made. A first strip 8 is placed on the surface 11 parallel with the edge A of said surface and centered relative to grooves a and b. A reinforcing bar 9 is placed in groove b. A second strip 8 is then placed on the table top 11 and it is likewise disposed parallel to the edge 14 thereof and is centered relative to grooves b and c. The second strip 8 thus overlaps the first by a width $\mu+2\beta$. A reinforcing bar 9 is placed in groove c and the operation is repeated until the table top 11 is covered. Once the strips 8 have been put into place on the table top 11, they are temporarily locked in position relative to one another by pressing them against the table top by means of the retaining means whose rules 7 and 7' press firmly against the side edges. That is why the strips 8 are cut longer than the width of the curtain to be fabricated. The positions of the moving retaining member is adjusted so that the distance between the facing sides of the rules 7 and 7' is equal to the width W of the curtain. Then the first strip is welded to the second and the second is welded to the third and so on. Advantageously, the welding device includes two welding shoes 6 and 6' spaced apart at a distance equal to the width of the sheaths. In this way, a sheath is welded in a single welding pass. Once all of the strips 8 present on the table top 11 have been welded together in pairs, the portion of curtain made so far is cut along the rules 7 and 7' so as to have exactly the desired width. The above-described operations are repeated as often as necessary, and finally the pieces of curtain made in this way are assembled. Fabrication of a curtain of the type described above is particularly simple and requires little manpower, since the rolls of plastified cloth may be provided by the manufacturer at the desired width. Conventional type opaque curtains can be obtained very rapidly and they are well trued-up. If a table is used whose top 11 does not have grooves, the strips 8 are welded to one another without initially placing the reinforcing bars between said strips at the locations where the sheaths are to be made by welding. The reinforcing bars are inserted into the sheaths after the curtain has been made.

However, this method of assembling strips of plastified cloth by welding with the junction zones between said strips constituting sheaths with the two faces of each sheath being portions of the two adjacent strips is not suitable for fabricating curtains which include insulating material trapped between two layers of plastified cloth or for fabricating curtains including transparent zones, except insofar as windows can be made in an opaque curtain in conventional manner which is not completely satisfactory, as mentioned above.

That is why an original method has been conceived for making completely opaque curtains, curtains which are completely or partially transparent, and curtains which include insulating material trapped between two layers of plastified cloth.

FIG. 3 is a diagrammatic section through a curtain which may be opaque, or which may be partially or totally transparent, said curtain being made using the apparatus shown in FIG. 1, i.e. apparatus including a grooved table top 11.

This curtain is made by cutting out tapes of plastified cloth 10 having a width $\mu+2\beta$ (where $\mu$ is the width of a sheath and $\beta$ is the width of the overlap margin required for welding), with each tape being slightly longer than the width W of the curtain. Strips of plastified cloth 12 or of transparent material are cut having a length slightly longer than the width W of the curtain and having a width approximately equal to $l_1-\mu$. A first tape 10 is disposed in each of the grooves a to f in the table top 11, with each tape running parallel to the edge A and being centered in the corresponding groove. A reinforcing bar 9 is then placed in each groove on the tape 10 therein. Then, between each consecutive pair of grooves, a strip 12 is disposed which is centered so that each of its sides edges overlaps the adjacent tape 10 by a margin of width $\beta$. Then, a second tape 10' is placed over each of the reinforcing bars 9 with the tapes being centered so that each of their side edges overlaps the adjacent strip 12 by a margin of width $\beta$. Once this positioning stage is complete, the portion of curtain present on the table top 11 is welded as described above with reference to the curtain shown in FIG. 2. This method is particularly advantageous in that it enables curtains to be made which are completely transparent or which include transparent zones of maximum area (supposing that a curtain is to be transparent over a portion of its height only) and such curtains are not available in the prior art. A curtain of this type is made quickly and requires minimum manpower given, in particular, that the initial cutting of the tapes 10 and of the strips 11 is limited to transverse cutting (assuming that the rolls 16 of plastified cloth and/or of transparent material are provided at the desired width). In addition, the curtain is accurately trued-up and does not include weak zones due, in particular, to intermediate vertical welds.

The curtain shown in diagrammatic section in FIG. 4 is obtained using the same fabrication method as described with reference to the curtain shown in FIG. 3. However, it differs from the above curtain in that one or more layers 13 of an insulating material are disposed on a first strip 12 (only one layer is shown in FIG. 4, but this number is arbitrary), said insulating material having the same length as the strip 12 and having the same width or a slightly smaller width, with the welding station 5 being designed to weld through at least five thicknesses of plastified sheet, of transaparent material, or of insulating material. A second strip 12' is then placed over the layer 13. Finally, each reinforcing bar 9 is covered with a tape 10' overlapping two consecutive top strips 12' and the assembly is then welded together. The strips 12 may be made of plastified cloth or of transparent material. If made of transparent material, circular or polygonal cutouts are made through the layers 13 of insulating material so as to provide a degree of visibility and also to constitute a buffer of insulating air. The original method described above is suitable for making a curtain of the same type as that described in U.S. Pat. No. 4,397,347.

In order to make the curtains shown in FIGS. 3 and 4, and supposing the parts are fastened together with glue, the appropriate part of the curtain (tape or strip) is glued on its top surface after being positioned on the part beneath and prior to being covered with the part that comes immediately above.

FIGS. 5 and 6 show two curtains which are close respectively to the curtains of FIGS. 3 and 4 and differ therefrom in that they include uniformly spaced straps 19. In accordance with French Pat. No. 2 539 181, at least two uniformly spaced straps are fixed to large sized flexible curtains, and in particular to curtains which are weighed down by a series of horizontal reinforcing bars, said straps being intended to prevent the curtain from deforming by creep and for keeping the reinforcing bars at a uniform spacing. In accordance with the fabrication method of the invention, after putting the strips 12 (FIG. 3) or 12' (FIG. 4) into place, at least two straps 19 are disposed perpendicularly thereto, said straps being advantageously made of braided synthetic fibers. Thereafter, as described above, a tape 10' is placed over each bar 9 so as to overlap the two strips 12 (or 12') adjacent thereto, equally. The curtains shown in FIGS. 5 and 6 are welded in the same manner as the curtains shown in FIGS. 3 and 4. After said welding, the straps 19 are fixed to the curtain at two points level with each sheath.

In order to make curtains as shown in FIGS. 3 to 6, and also in order to make the curtain shown in FIG. 2, it is possible to use a table with a groove-free top 11 by welding the various curtain components (the strips 12, 12', the tapes 10, 10', and optional insulating layers 13 and uniformly spaced straps 19) to one another wihout putting the reinforcing bars into place relative to said components in the locations where the welding operation makes the sheaths. The reinforcing bars are inserted into the sheaths after the curtain has been made.

The closure installations for some premises must satisfy certain requirements. Thus, warehouses for containing perishable goods must, as far as possible, avoid using materials which would leave portions which are completely or substantially inaccessible to regular disinfection. This applies in particular to the sheaths containing reinforcing bars disposed on the above-described curtains. In order to make such curtains more suitable for use in such premises, two possible solutions can be provided. A first solution consists in cutting the reinforcing bars so that they are significantly shorter that the width of the curtains they reinforce and then closing the ends of the sheaths by welding. Another solution consists in welding together the ends of the sheaths without sliding reinforcing bars therein. Then, the curtain is stiffened by using two-part bars such as 20 and 20' which are fixed to each other along the tapes 10 and 10' so as to clamp the curtain therebetween, sandwich-like (as shown in FIG. 7).

When intended to provide concertina-type doors, curtains in accordance with the invention may be preformed after being fabricated by the method described above so as to fold easily while being raised. After the last portion of curtain has been welded and before the reinforcing bars have been inserted in the sheaths, this is done by folding the entire curtain concertina-like so as to form a fold at each sheath and a fold in the middle of each strip. The folded curtain is then baked at a sufficiently high temperature to give rise to irreversible deformation of the texture of the material from which the curtain is made, along each fold. A curtain that has been preformed in this way will always take up the folds that were initially applied thereto.

In accordance with an advantageous characteristic of the welding station 5, the welds due to application of the welding shoes 6 and 6' on the plastified cloth do not form a continuous thin line, but instead provide a discontinuous area with alternating longitudinal zones where the plastic has melted and zones where it has not melted. Welds of this type provide a better joint between two consecutive strips around a sheath, and more particularly between two consecutive panels including a layer of insulating material 13 sandwiched between two strips 12 and 12' of plastified cloth or of transparent material.

The present invention is not limited to the above-described embodiments. It is capable of being varied or modified by the person skilled in the art. In particular, the method can be used to make curtains in which the parts are assembled by gluing or by sewing, simply by changing the welding station of the manufacturing apparatus as described above for a station suitable for gluing or sewing.

I claim:

1. A method of fabricating a flexible curtain of width W which is stiffened at regular intervals by a plurality of horizontal reinforcing bars (9) individually disposed in a plurality of sheaths and which is of the type suitable for providing a goods-handling door, the method comprising the steps of:

(a) cutting strips of appropriate flexible material, said strips being of a length which is not less than substantially the desired width W for the curtain;

disposing said strips in parallel on a reference plane (11) such that their side edges are parallel, with each pair of adjacent strips overlapping by a width approximately equal to the width ($\mu$) of a reinforcing bar sheath plus a width of two overlap margins ($\beta$) respectively flanking each sheath width for fastening said strips together;

holding the strips disposed in this manner relative to one another and relative to the reference plane; and successively fastening the strips in pairs over at least two fastening lines running parallel to their longitudinal edges and provided respectively in each of said two overlap margins which are separated by approximately the width of the sheaths.

2. A fabrication method according to claim 1, where the strips are cut to a length which is longer than the desired width of the curtain, and wherein the method further includes, after the step of fastening the strips to one another, a step of cutting the edges of the curtain obtained in this way so as to give it the desired width W.

3. A fabrication method according to claim 1, wherein it further includes, after the step of positioning the strips relative to one another on the reference plane, a step of sandwiching a reinforcing bar between two consecutive strips, said bar being centered in the overlap margin of the said strips.

4. A fabrication method according to claim 1, further including the following steps after the step of fastening the strips to one another;

the curtain is folded concertina-like with a fold being formed level with each sheath and another in the middle of each strip; and the folded curtain is baked so as to give rise along each fold to irreversible deformation of the flexible material from which the curtain is made.

5. A fabrication method according to claim 1, wherein the strips are fastened to one another by welding.

6. A fabrication method according to claim 1, wherein the strips are fastened to one another by sewing.

7. A fabrication method according to claim 1, wherein the strips are fastened to one another by gluing.

8. A method of fabricating a flexible curtain of width W which is stiffened at regular intervals by a plurality of horizontal reinforcing bars (9) individually disposed in a plurality of sheaths and which is of the type suitable for providing a goods-handling door, said method comprising the steps of:

cutting tapes of a suitable flexible material into lengths which are not less than substantially the desired width W of the curtain and of widths approximately equal to the width ($\mu$) of a reinforcing bar sheath plus a width of two overlap margins ($\beta$) respectively flanking each sheath width;

cutting strips from at least one suitable flexible material, said strips having substantially the same length as the tapes;

disposing first tapes (10) in parallel on a reference plane (11);

disposing at least one strip (12) between each consecutive pair of tapes so that the side edges of the strips are parallel and so that a longitudinal edge of each strip overlaps an adjacent tape edge by an amount approximately equal to the width of an overlap margin;

disposing second tapes (10') over the strips positioned in this way so that each second tape overlaps two consecutive strips, with the side edges of said tapes and said strips being parallel and each of the longitudinal edges of a second tape covering the edge of a contiguous strip over a width approximately equal to the width of an overlap margin;

holding the strips and the tapes as disposed in this way in position relative to one another and relative to the reference plane; and fastening the strips and the tapes by sandwiching them together at least over two fastening lines running parallel to their longitudinal edges, said lines being respectively formed in the two overlap margins situated on the longitudinal edges of said tapes.

9. A fabrication method according to claim 8, in which the tapes and the strips are cut to a length which is longer than the desired width W of the curtain, the method including, after the step of fastening the strips in position relative to one another, a step of cutting the edges of the curtain obtained in this way so as to give the curtain the desired width W.

10. A fabrication method according to claim 8, including, after the step of positioning the first tapes and the strips relative to one another, a step of disposing at least two uniformly spaced straps perpendicular to said strips and tapes.

11. A fabrication method according to claim 8, including, after the step of positioning the first tapes and the strips relative to one another, a step of disposing reinforcing bars between consecutive pairs of strips.

12. A fabrication method according to claim 8, further including the following steps, after the step of fastening the tapes and the strips to one another:

folding the curtain concertina-like, with a fold at each sheath and another fold in the middle of each strip; and baking the folded curtain to give rise along each fold to irreversible deformation of the flexible material from which the curtain is made.

13. A fabrication method according to claim 8, wherein the tapes and the strips are fastened to one another by welding.

14. A fabrication method according to claim 8, wherein the tapes and the strips are fastened to one another by sewing.

15. A fabrication method according to claim 8, wherein the tapes and the strips are fastened to one another by gluing.

16. A fabrication method according to claim 5 or 13, wherein the welds are welds in the form of thin strips, and wherein said welds have a discontinuous surface comprising alternating longitudinal zones where the material of the strips and/or the tapes have melted and zones where it has not melted.

* * * * *